United States Patent [19]

Fujita et al.

[11] Patent Number: 5,313,403
[45] Date of Patent: May 17, 1994

[54] NUMERICAL CONTROL APPARATUS HAVING A CIRCULAR INTERPOLATION LOCUS DISPLAY FUNCTION AND CONTROL METHOD THEREOF

[75] Inventors: Jun Fujita; Teturo Kurokawa; Sadaji Hayama, all of Shizuoka, Japan

[73] Assignee: Toshiba Kikai Kabushiki Kaisha, Tokyo, Japan

[21] Appl. No.: 59,416

[22] Filed: May 11, 1993

Related U.S. Application Data

[63] Continuation of Ser. No. 643,587, Jan. 22, 1991, abandoned.

[30] Foreign Application Priority Data

Jan. 23, 1990 [JP] Japan ................................. 2-14656

[51] Int. Cl.⁵ ............................................. G06F 15/46
[52] U.S. Cl. ............................ 364/474.26; 364/474.29
[58] Field of Search ................... 364/474.26, 474.03, 364/474.05, 474.29, 474.31, 474.35, 474.04, 434; 318/604, 616, 572, 128, 801, 621, 618, 568.2, 646, 586, 567

[56] References Cited

U.S. PATENT DOCUMENTS

| | | | |
|---|---|---|---|
| 3,648,031 | 3/1972 | Neal | 318/616 |
| 4,031,369 | 6/1977 | Heaman et al. | 364/474.31 |
| 4,672,550 | 6/1987 | Winterbottom et al. | 318/604 |
| 4,797,829 | 1/1987 | Martorella et al. | 364/434 |
| 4,914,726 | 4/1990 | Burke | 318/646 |
| 4,935,682 | 6/1990 | McCuen | 318/586 |
| 5,005,135 | 4/1991 | Moyser et al. | 364/474.35 |
| 5,051,912 | 9/1991 | Johamson et al. | 364/474.04 |

FOREIGN PATENT DOCUMENTS 63-146107 6/1988 Japan .

OTHER PUBLICATIONS

English translation of 63-146107.
Kakino et al., "Study on the Motion Accuracy of NC Machine Tools (1st Report)", The Measurement and Evaulation of Motion Errors by Double Ball Bar Test, Journal of the Japan Society of Precision Engineering, vol. 52, No. 7, 1986, pp 85-90 (English Abstract Enclosed).

*Primary Examiner*—Jerry Smith
*Assistant Examiner*—Jim Trammell
*Attorney, Agent, or Firm*—Cushman, Darby & Cushman

[57] ABSTRACT

A method for displaying a circular interpolation locus which is used in a numerical control apparatus. The method is constituted by the steps of detecting movements of axes controlled by the numerical control apparatus, synthesizing signals detected in the detected step, displaying a movement locus of two axes as a circular interpolation locus on a display. A numerical control apparatus which has a circular interpolation locus display function is also disclosed. The numerical control apparatus is constituted by first detecting unit for detecting a motion of a control object controlled by a first servo motor, second servo detecting unit for detecting a motion of the control object by a second servo motor, two axes synthesizing unit for synthesizing the output signals for the first detecting unit for displaying the two axes movement locus. The method and apparatus can be applicable both semi-closed loop and hybrid control.

17 Claims, 3 Drawing Sheets

NUMERICAL CONTROL APPARATUS HAVING A CIRCULAR INTERPOLATION LOCUS DISPLAY FUNCTION AND CONTROL METHOD THEREOF

This is a continuation of application Ser. No. 07/643,587, filed on Jan. 22, 1991, which was abandoned.

BACKGROUND OF THE INVENTION

1. Field of the Invention

This invention relates to a numerical control method and an apparatus thereof.

More specifically, this invention relates to a numerical control method and an apparatus thereof which have a circular interpolation locus display function for setting and adjusting servo parameters in order to use the most suitable servo characteristics in a machining process.

2. Description of the Related Art

Machine tools which execute three dimensional cutting or the like, have drive mechanisms which are arranged in each axis thereof, such as the X-axis, the Y-axis, and the Z-axis. A tool attached on a machine tool is simultaneously controlled by such drive mechanisms. As a result, more accurate three dimensional motion is made and three dimensional cutting, machining or the like, are executed.

A controller is used for these multi axes simultaneous control which uses a program control. This is a so called "numerical control apparatus (NC apparatus)".

Numerical control apparatus analyze a machining program which is externally input, and also analyze each command input in the machining program. Data for each axis are output in accordance with these commands, and a machining process is automatically executed. As a result, the machine tool, or the like, are controlled to have a desired motion.

Such an NC-device analyzes respective movement command values for the shafts from a predetermined movement command program input externally, and sequentially outputs the respective thus-analyzed command values into driving mechanisms for the corresponding shafts of the machine tool to thereby cause the respective driving mechanisms to cooperate and hence to cause the machine tool to automatically execute a desired operation set in the program.

If the machine tool executes a circular cutting motion, at least simultaneous two axis control is required. For example, when a real circle which as a radius r is described in the X-Y plane and the center of the circle has the coordinates ($X_0$, $Y_0$) in X-axis and Y-axis respectively, the X value and the Y value are controlled with cooperation in the expression:

$$(x - X_0)^2 + (h - Y_0)^2 = r^2 \quad (1)$$

Each axis value is simultaneously controlled according to:

$$X = (r \cos \theta + X_0) \quad (2)$$
$$Y = (r \sin \theta + Y_0)$$

When adjusting such simultaneous two axes control, if each servo characteristics is not adjusted well, an error occurs. The cutter path becomes different from the coordinates of a command value and the machining accuracy decreases.

There are many methods for servo adjustment, such as, gain adjustment, gain discrepancy adjustment between two axes, anticipation control, backlash compensation, and projection control or the like. These methods are used for adjusting the error corresponding to several error elements using the DBB measurement apparatus (Kakino et al. Study of the Motion Accuracy of NC Machine Tools (1st report)), *Journal of The Japan Society of Precision Engineering*, Vol. 52, July 1986 or the like, and these methods need expensive measurement tools and a high skill. An example of this is found in copending application Ser. No. 07/548,704, U.S. Pat. No. 5,189,627.

In another method, a circular cutting test is executed using a test piece, and the deviation of the circle from a perfect circle is measured by a circle perfection measurement apparatus. This method takes labor and time. Further, this method is effected by spindle rotation and a tool, so that it has not been estimated exactly.

Therefore, in the related art, such as DBB measurement apparatus or circular interpolation movement accuracy measurement method, much labor and time are needed. Thus, it has been desirable to provide an NC method and NC apparatus which are able to shorten the amount of labor and time for adjusting servo characteristic.

SUMMARY OF THE INVENTION

It is an object of the present invention to provide a method for displaying a circular interpolation locus to adjust a suitable servo parameter for obtaining an optimum servo characteristics.

It is another object of the present invention to provide an apparatus having a circular interpolation locus display function.

According to the present invention, there is provided a method for displaying a circular interpolation locus, comprising the steps of detecting movements of axes controlled by the numerical control apparatus, synthesizing signals detected in the detecting step, displaying a movement locus of two axes as a circular interpolation locus on a display of the numerical control apparatus using signals synthesized in the synthesized step.

According to another aspect of the present invention there is also provided a numerical control apparatus having a circular interpolation locus display function, comprising first detecting means for detecting a method of a control object by a first servo motor which controls a first axis and for outputting a detected signal; second detecting means for detecting a motion of the control object by a second servo motor which controls a second axis and for outputting a detected signal; two axes synthesizing means for synthesizing the output signals for the first detecting means and the second detecting means; and display means for displaying the two axes movement locus from an output signal of the two axis synthesizing means so as to obtain optimum servo characteristics for the first and second servo motors.

BRIEF DESCRIPTION OF THE DRAWINGS

The invention can be fully understood by reference to the accompanying drawings in which.

DETAILED DESCRIPTION OF THE PREFERRED EMBODIMENT

The preferred embodiments of the present invention will now be described in more detail with reference to the accompanying drawings.

Figure 1:
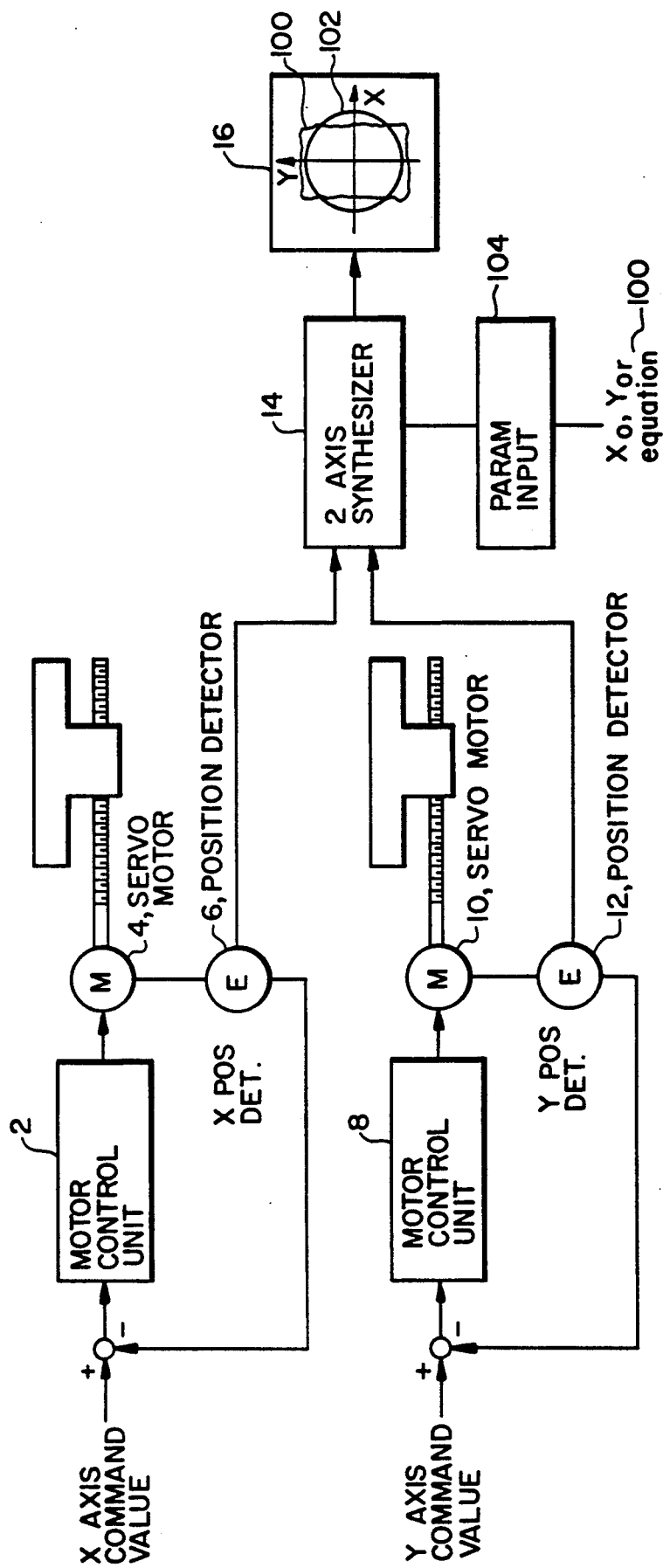
FIG. 1 is a control block diagram of the numerical control apparatus of the present invention, which controls in semi-closed loop operation.

An embodiment of a numerical control apparatus of the present invention having a circular interpolation locus display function is shown in FIG. 1.

A semi-closed loop control is preferably applied in this embodiment.

The embodiment of FIG. 1 includes X-axis motor control unit 2, Y-axis motor control unit 8, X servo motor 4, Y servo motor 10, X-axis position detector 6, Y-axis position detector 12, two axis signal synthesizer 14 and CRT display 16.

X-axis position detector 6 and Y-axis position detector 12 are attached to rotation axis shafts of X servo motor 4 and Y servo motor 10 respectively and detect the rotational motion and the rotational direction of the servo motors. Normally an optical encoder or optical pulse generator or the like are used as the position detector.

X position detector 6 and Y position detector 12 output each output signal and two axis signal synthesizer 14 is provided for synthesizing the output signals from these position detectors.

CRT display 16 is also provided and displays the output signal of two axis signal synthesizer 14.

The operation of the present embodiment is described next.

When X-axis command is input, X servo motor 4 is controlled and rotated by X motor control unit 2. The rotation motion of the X servo motor 4 is detected by X position detector 6 attached to X servo motor 4, and the output signal of the X position detector 6 is connected to an input terminal of two axis signal synthesizer 14. Two axis signal synthesizer therefore receives the actual locus of the main shaft II in this way.

When Y-axis command is input, Y servo motor 10 is driven and rotated by Y motor control unit 8. The rotational motion is detected by Y position detector 12 attached to Y servo motor 10.

Figure 3:
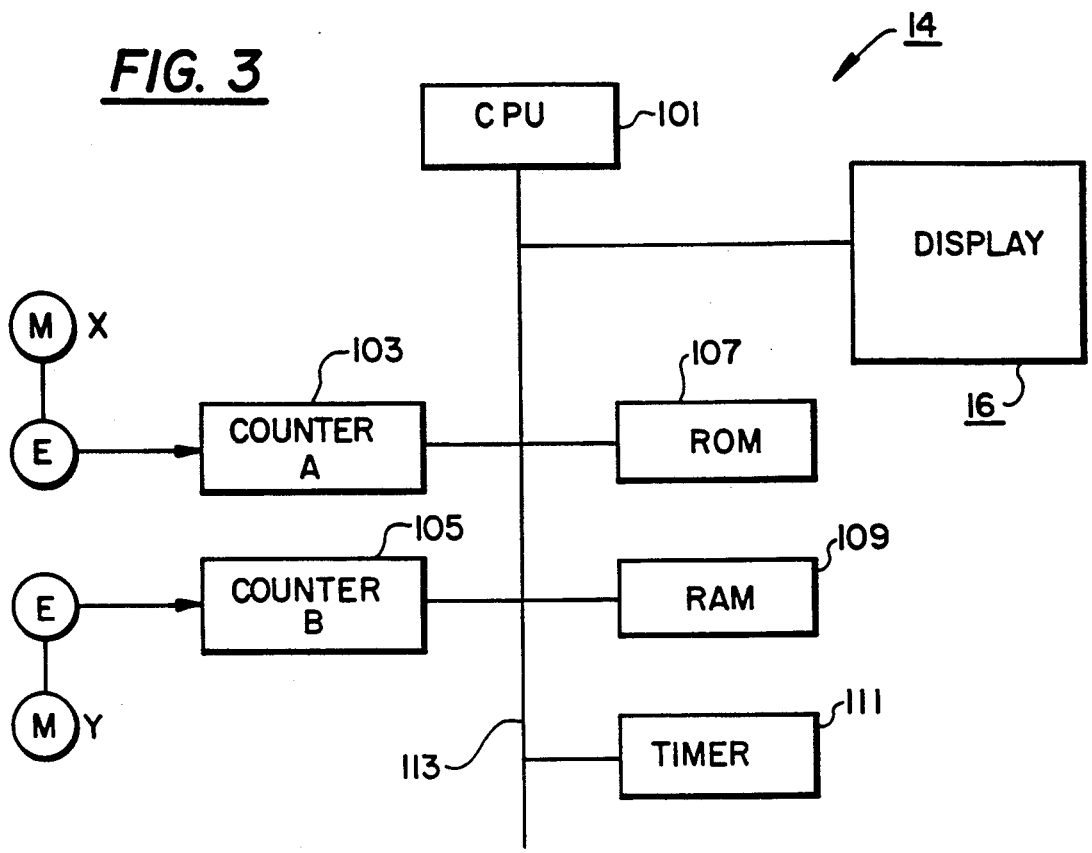
FIG. 3 shows a block diagram of the synthesizers of the present invention.

The output signal of Y position detector is connected to another terminal of two axis signal synthesizer 14, and the output signal from two axis synthesizer 14 is displayed on the CRT display 16 to show the actual locus 100. The two axis synthesizer can, for instance, be embodied by an X, Y decoder and video memory, or by a microprocessor. FIG. 3 shows a block diagram example of the internal circuit diagram for the synthesizer 14.

The synthesizer 14 includes CPU 101, counter A 103, counter B 105, ROM 107, RAM 109, and timing circuit 111. CPU 101 controls all data via data bus 113. ROM 107 stores a program for synthesizing a circular arc. RAM 109 is utilized as a temporary data storage for the data calculated by the CPU 101. Timing circuit 111 generates pulses, and periodically interrupts CPU 101 via bus 113.

Counter A 103 counts the position data generated by an encoder, for example X axis position encoder. Counter B also counts the position data generated by another axis encoder, for example Y axis position encoder.

To calculate a real displacement of a circular arc and deviation responsive to a command, CPU 101 reads the position data of counter A 103 and counter B 105 periodically in the interval time determined by the timing circuit 111. CPU 101 then synthesizes the circular locus using the program stored in ROM 107. CPU calculates the deviation coordinates from command locus ($x_d$, $y_d$) using the formulae:

$$r_f = \{(x-x_0)^2 + (y-y_0)^2\}^{\frac{1}{2}} \qquad (1)$$

$$X_d = \{(r_f - r) * K_d + r_d\} * x/r \qquad (2)$$

$$Y_d = \{(r_f - r) * K_d + r_d\} * y/r \qquad (3)$$

Where:
center coordinates of the circular arc are ($X_0$, $Y_0$),
coordinates of position feedback are (X, Y),
deviation coordinates from the command are ($X_d$, $Y_d$),
radius of the command value is r,
radius of the real feedback value is $r_f$,
radius for command pass display is $r_d$, and
factor for error expansion display is $K_d$.

The commanded locus 102 is also displayed on CRT display 16 as a circular interpolation locus. The desired servo characteristics of the control system including numerical control apparatus and servo motor is estimated by the picture of the locus displayed on CRT display 16. Parameters 106 are input into parameter input device 104, which calculates the actual locus for these parameters. This actual locus is displayed as locus 100, superimposed with locus 102.

Figure 4:
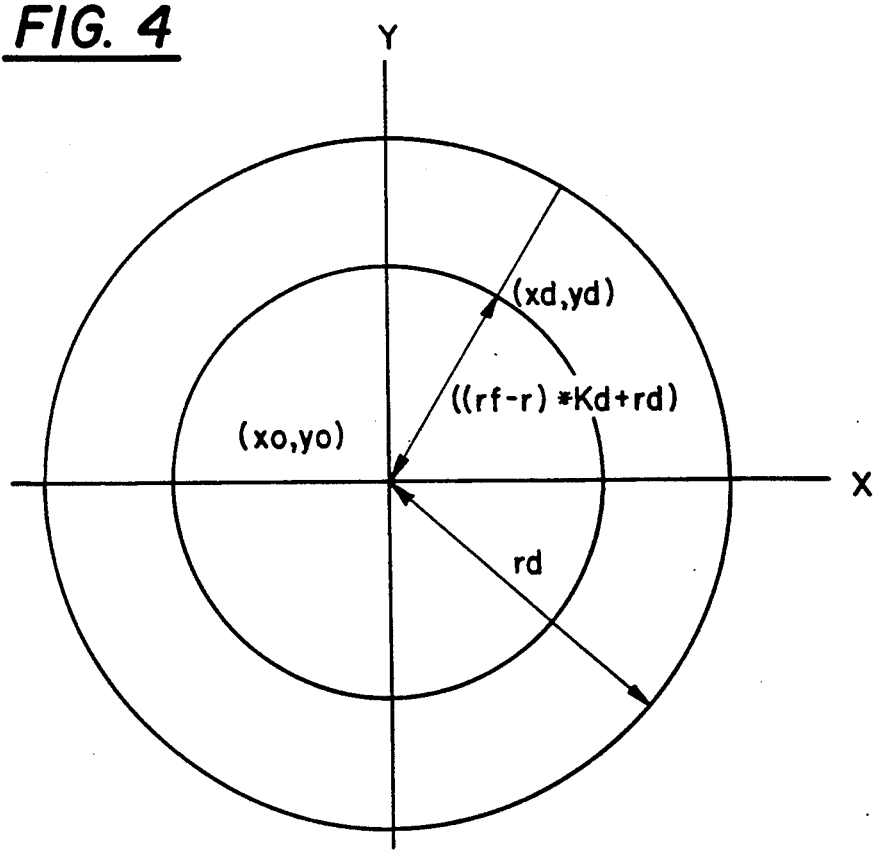
FIG. 4 shows an example of the display that is used.

FIG. 4 shows an example of the display which is generated. The solid line shows a measured circular arc, and the broken line shows the circular arc of the command.

The operator of the numerical control apparatus is thus able to set and adjust servo parameters so as to get optimum servo characteristics. Servo parameters are one of the system parameters which are used for adjusting servo characteristics in the numerical control apparatus, and are used widely in such numerical control apparatus.

Figure 2:
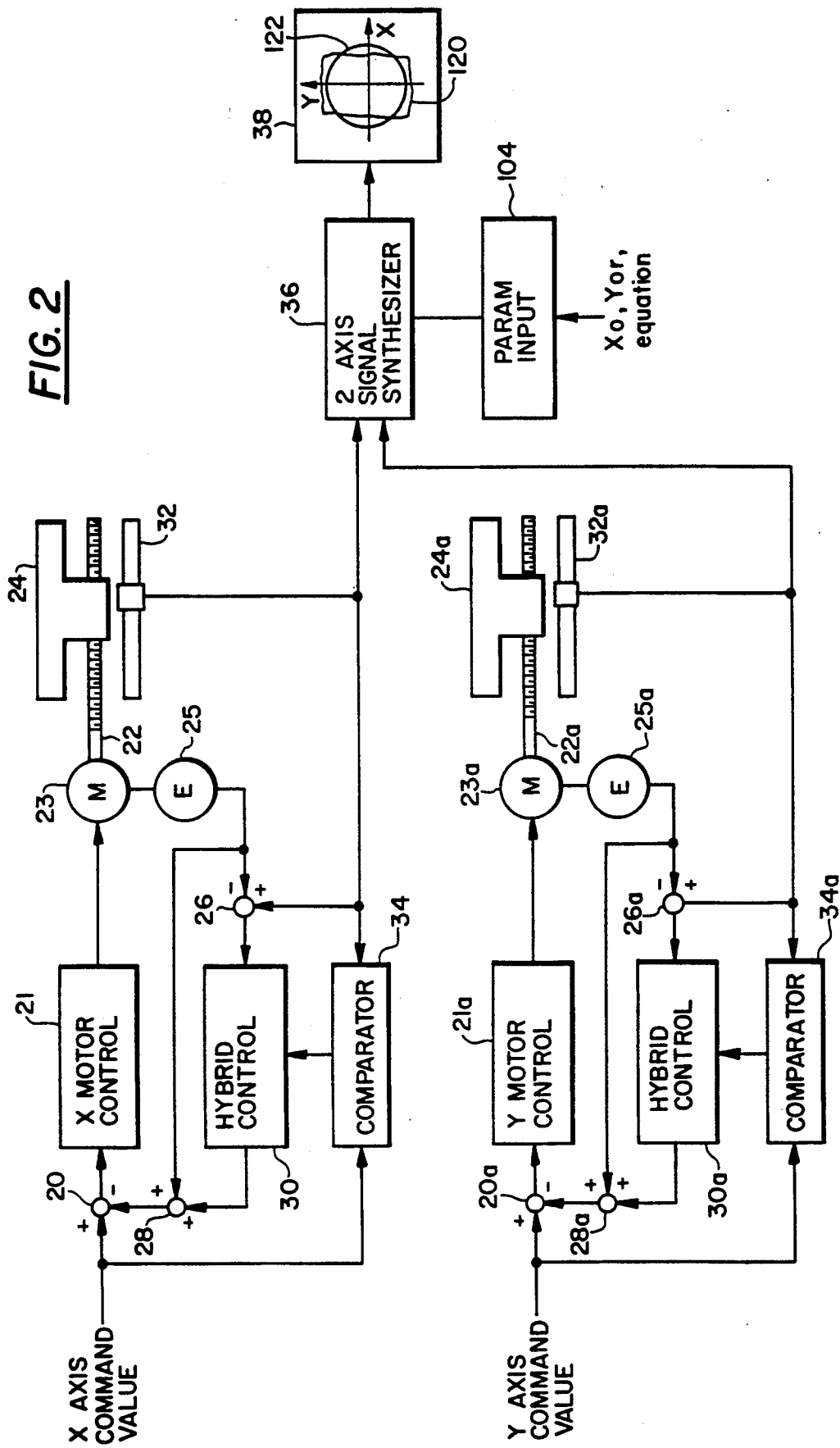
FIG. 2 is a control block diagram of the numerical control apparatus of the present invention, which controls in full-closed loop or in hybrid control operation.

Another embodiment of the present invention is shown in FIG. 2. This numerical control apparatus has a circular interpolation locus display function and controls in either a full closed loop control or using hybrid control.

The full closed loop control and the hybrid control are interchanged by the adjustment of an element of time lag of first order in hybrid control 30 (herein time lag element).

When a feedback signal from a linear scale position detector is used, it is called "a full closed loop control".

When a feedback signal from a linear scale and a feedback signal from a position detector for a servo motor are used, it is called "a hybrid control".

In the figure, elements which are similar to the elements in FIG. 1 are numbered with the same reference numbers, so that a detailed description is believed unnecessary.

The embodiment includes X-axis motor control unit 21, X servo motor 23 and X-axis position detector 25 the same as in the first embodiment.

The embodiment also includes first adder 20, second adder 26 and third adder 28, element of time lag of first order in hybrid control 30, comparator 34 and linear position detector 32 for the X-axis.

The embodiment also includes the same elements to determine positions on the X-axis and Y-axis. The elements have the same reference numbers and also have the suffix a in the figure.

As shown in FIG. 2, X command signal is input to the first adder 20 and the output signal from the first adder 20 is connected to X motor control unit 21.

The output of X motor control circuit 21 is connected to X servo motor 23 and ball screw 22 is engaged to the shaft which is rotated by X servo motor 23. When ball screw 22 is rotated, X displacement unit 24, such as a table, is moved.

On the other hand, rotational motion of the X servo motor 23 is detected by X position detector 25 attached to X servo motor, and the output signal from X position detector 25 is input to the second adder 26. The output signal from X position detector 25 is branched off and is input to an input terminal of the third adder 28.

The output of the second adder 26 is connected to hybrid control primary delay element 30, and the output terminal of hybrid control primary delay element is connected to another terminal of the third adder 28.

Further, linear position detector 32, such as a linear scale or the like, is arranged near displacement unit 24. The output of linear position detector 32 is connected to another input terminal of the second adder 26, and is also input to an input terminal of comparator 34. Another input terminal of comparator 34 is connected to X-axis command signal. Furthermore, the output signal of linear position detector is connected to two axis signal synthesizer 36.

As already described, the constitution for the Y-axis is similar to the X-axis, so that suffix a is added for the Y-axis circuitry, and a detailed description is believed unnecessary.

In operation, when X-axis command signal is input, X servo motor 23 is rotated by X motor control unit 21. The rotation power of X servo motor 23 drives and rotates ball screw 22 and displacement unit 24 is moved in a direction responsive to this rotation.

The actual displacement of displacement unit 24 is detected by X linear position detector 32. On other hand, the rotation of X servo motor is detected by X position detector 25 for X servo motor 23. The output signal of X linear position detector 32 and the output of X position detector 25 for the X servo motor are added together by the second adder 26. The difference signal from the second adder 26 is input to time lag element 30.

Time lag element 30 is a kind of low pass filter. The detected value of the linear position detector is calculated digitally and is weighted by the linear position detector.

The characteristic of the time lag element 30 can be expressed as $$H(s) = (1 + Th)/\{s + (1/Th)\} \qquad (4)$$

wherein,

H(s): transfer function of time,
Th: time constant of the first order time lag filter, and
s is the laplacian.

Comparator 34 compares the output signal of linear position detector 32 and X-axis command value and outputs a control signal for time lag element 30.

The output signal of time lag element 30 is added with the output signal of position detector 25 of the servo motor by the third adder 28, and the added signal from the third adder 28 is sent to the first adder 20, where it functions as a subtracting element against the X command value.

As described above, X-axis is controlled in a hybrid control by the feedback signals from linear position detector 32 and position detector 25 for X servo motor. The displacement signal of displacement unit 24 is detected by linear position detector 32, and is input to two axis signal synthesizer 36.

Since the synthesizer 14 is similar to synthesizer 36, only synthesizer 14 has been described, but it should be understood that the teachings would be applicable to both.

Hybrid control is also used for the Y-axis, and the output signal of linear position detector 32a is input to another input terminal of two axis signal synthesizer 36. Synthesizer 36 therefore displays actual position locus 120.

Accordingly, CRT display 38 in the numerical control apparatus can display a picture for circular interpolation including actual position locus 120 in accordance with the output signal from two axis signal synthesizer 36, and calculated position locus 122 calculated by CPU 104.

Thus, in the case of a full closed loop or a hybrid control, the circular interpolation locus displayed on CRT display 38 shows the synthesis of the actual two axis motion of the machine, such as a machine tool. The servo characteristics of the numerical control apparatus and the machine tool, or the like, can be understood by the picture displayed on CRT display 32 and compared with the calculated valve, calculated by CPU 104, in accordance with the input parameters.

Accordingly, parameters of the control system including the feed system can be adjusted in order to reach optimum servo characteristics.

When the circular interpolation locus is displayed on the CRT display 16 or the CRT display 38, a basic circuit based on the X-axis and Y-axis command value input into parameter input block 104 is used, which are synthesized by synthesizer 14 or synthesizer 36. The difference value between this basic circle value and the real position value detected by position sensors is calculated and can be displayed in an exaggerated expanded form so that even small differences can be easily viewed.

Further, when servo adjustment is executed using this function, system parameters in the numerical control apparatus is used and set to start the function.

There are several methods to arrange this function in the numerical control apparatus.

The first method is to arrange all of this system in the main body of the numerical control apparatus. The second method is to store this function in a external memory system, such as a bulk memory system, flexible disk drive system, IC card system or the like, and the function stored in the external memory system is used when servo adjustment is executed.

As described above, according to the numerical control apparatus of the present invention, in the case of semi-closed loop control, a circular interpolation locus which is based on the motion of servo motor is produced. Thus, the size of projections in quadrant change, projection compensation, existence of vibration and pulsation motion, upper gain value, slippage of gain between two axes, reduction value of radius caused by a servo time lag, or the like can be easily estimated. As a result, the optimum servo characteristics can be obtained.

In the case of hybrid control, a circular interpolation locus which is based on the motion of control axis, such as a table motion, is produced. Thus, all items in semi-closed loop control, in addition adjustment of backlash and elements of time lag for hybrid control can be estimated. As a result, the optimum servo characteristics including the numerical control apparatus and machine mechanism can be adjusted and obtained.

Further, a circular interpolation locus can be displayed on a numerical control apparatus, and servo adjustment also can be executed. Thus, a measurement apparatus for circular interpolation motion accuracy or circular cutting test using a test piece is not needed. Accordingly, servo adjustment can be easily executed at a factory shop. As a result, man hours of testing process can be reduced.

Furthermore, servo adjustment can be alone at the customer's factory and also be done in a service time after the delivery of the machine, such as a machine tool. As a result, it is useful to maintain the performance of the machines.

In the example given for the synthesizer, CPU 101 has been as an independent processor. However, another processor, for example a CPU of the numerical control apparatus, could be used, so that this apparatus could be arranged in the numerical control apparatus together.

What is claimed is:

1. A method for displaying a circular interpolation locus of a numerical control apparatus, comprising the steps of:
    obtaining a commanded circular interpolation locus in a form suitable for display;
    detecting movements of two axes that are controlled by said numerical control apparatus responsive to said commanded circular interpolation locus and generating detected signals related to said movements;
    synthesizing signals from said detected signals generated in said detecting step into a form suitable for display; and
    displaying said commanded circular interpolation locus on a display and displaying the movement locus of said two axes as a circular interpolation locus on the display, superimposed on said displayed commanded circular interpolation locus, using signals synthesized in said synthesized step to thereby simultaneously display a command circle and a measured circle,
    wherein said displaying step includes the steps of:
    calculating a difference between values of said commanded circular interpolation locus, and values of said measured circular interpolation locus;
    exaggerating an amount of said difference, and
    displaying said command circle and said measured circle in their entirety while displaying an exaggerated difference between an actual value from a command circuit and said circular interpolation locus which emphasizes the difference therebetween on the same display.

2. The method for displaying a circular interpolation locus of claim 1, wherein said detecting step includes a step of detecting rotation of a servo motor controlled by the numerical control apparatus.

3. The method for displaying a circular interpolation locus of claim 1, wherein said detecting step includes a step of detecting both rotation of a servo motor and a movement of a control object.

4. The method for displaying a circular interpolation locus of claim 3, wherein said detecting step includes a step of detecting a movement of a tool.

5. The method for displaying a circular interpolation locus of claim 3, wherein said detecting step includes a step of detecting a movement of a workpiece.

6. A method according to claim 1 wherein said obtaining step comprises the step of:
    obtaining parameters indicative of a commanded locus and calculating an actual locus for said parameters.

7. The method of claim 1, further comprising the step of low pass filtering said detected signals to generate weighted signals for said synthesizing step.

8. The method of claim 7, wherein said low pass filtering step includes the steps of digitally calculating a linear position and weighting said linear position using a first order time lag function as a low pass filter.

9. A numerical control apparatus having a circular interpolation locus display function, comprising:
    means for obtaining a commanded circular interpolation locus in a form suitable for display;
    first detecting means for detecting a motion of a control object by a first servo motor which control a first axis and for outputting a first detected signal indicative thereof;
    second detecting means for detecting a motion of the control object by a second servo motor which controls a second axis and for outputting a second detected signal indicative thereof;
    two axis synthesizing means receiving said first detected signal and said second detected signal, for synthesizing the outputs into a form suitable for display; and
    display means for displaying the displayed commanded circular interpolation locus superimposed with the two axis movement locus from an output signal of the two axis synthesizing means to obtain optimum servo characteristics for the first and second servo motors, said synthesizing means including:
    means for calculating a difference between values of said commanded circular interpolation locus, and values of said measured circular interpolation locus; and
    means for displaying said commanded circular interpolation locus and said measured circular interpolation locus in their entirety while exaggerating an amount of said difference, and displaying an exaggerated difference between an actual value from a command circuit and said circular interpolation locus which emphasizes the difference therebetween on the same display.

10. The numerical control apparatus of claim 9, wherein said first detecting means includes an optical value pulse generator for detecting rotation of the first servo motor.

11. The numerical control apparatus of claim 10, wherein said first detecting means includes linear position detecting means for detecting a linear movement of the control object controlled by the first servo motor.

12. The numerical control apparatus of claim 11, wherein said linear position detecting means includes a linear optical scale.

13. The numerical control apparatus of claim 9, wherein said second detecting means includes an optical pulse generator for detecting rotation of the second motor.

14. The numerical control apparatus of claim 13, wherein said second detecting means includes linear position detecting means for detecting a linear movement of the control object controlled by the second servo motor.

15. The numerical control apparatus of claim 14, wherein said linear position detecting means includes a linear optical scale.

16. The numerical control apparatus of claim 9, further comprising means for weighting said first detected signal and said second detected signal using a low pass filter to produce weighted signals.

17. The numerical control apparatus of claim 16, wherein said weighting means includes means for digitally calculating a linear position and weighting said linear position using a first order time lag function as said low pass filter.

* * * * *